United States Patent
Takegami et al.

(10) Patent No.: US 10,589,653 B2
(45) Date of Patent: Mar. 17, 2020

(54) UTILITY VEHICLE

(71) Applicant: KAWASAKI JUKOGYO KABUSHIKI KAISHA, Hyogo (JP)

(72) Inventors: Itsuo Takegami, Hyogo (JP); Kazuhiro Maeda, Hyogo (JP); Takashi Hisamura, Hyogo (JP); Kazumasa Hisada, Hyogo (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 23 days.

(21) Appl. No.: 15/889,795

(22) Filed: Feb. 6, 2018

(65) Prior Publication Data

US 2019/0241111 A1 Aug. 8, 2019

(51) Int. Cl.
*B60N 3/02* (2006.01)
(52) U.S. Cl.
CPC .................... *B60N 3/026* (2013.01)
(58) Field of Classification Search
CPC ....................................................... B60N 3/026
USPC ....................................................... 296/1.02
See application file for complete search history.

(56) References Cited

U.S. PATENT DOCUMENTS

| 8,827,028 B2 * | 9/2014 | Sunsdahl | B62D 21/183 |
| | | | 180/292 |
| 8,998,253 B2 * | 4/2015 | Novotny | B60R 21/13 |
| | | | 280/756 |
| 9,073,454 B2 | 7/2015 | Shinbori et al. | |

* cited by examiner

Primary Examiner — Joseph D. Pape
Assistant Examiner — Dana D Ivey
(74) *Attorney, Agent, or Firm* — Wenderotrh, Lind & Ponack, L.L.P.

(57) ABSTRACT

A utility vehicle includes a passenger grip including a handle grip having an arm part extending from a dashboard toward the passenger seat, and a grip part at the arm part and gripped by the crew seated on the passenger seat, a holder outserted to the arm part of the handle grip and holding the arm part movably forward and backward in an extending direction of the arm part, and a single-action lock mechanism at the holder and fixing the handle grip to the holder. The single-action lock mechanism includes a lock pin having a distal end penetrating a through hole at the holder and engaged with an engagement hole at the arm part, a spring biasing the lock pin toward the arm part, a housing fixed to the holder and accommodating the lock pin and the spring, and a knob outside the housing and connected to the lock pin.

5 Claims, 10 Drawing Sheets

UTILITY VEHICLE

BACKGROUND OF THE INVENTION

1. Technical Field

The present invention relates to a utility vehicle.

2. Description of Related Art

As disclosed in U.S. Pat. No. 9,073,454 and the like, there has been known a utility vehicle including a passenger grip provided ahead of a passenger seat and gripped by a crew member seated on the passenger seat.

The passenger grip provided ahead of the passenger seat is preferred to easily be mounted and dismounted as necessary.

SUMMARY

In view of the above, it is an object of the present invention to provide a utility vehicle including a passenger grip configured to be mounted and dismounted easily.

In order to achieve this object, according to an aspect of the present invention, there is provided
a utility vehicle including
a passenger grip for a crew at seated on passenger seat, the passenger grip including
a handle grip having an arm part extending from a dashboard toward the passenger seat, and a grip part provided at the arm part and gripped by the crew seated on the passenger seat,
a holder outserted to the arm part of the handle grip and holding the arm part movably forward and backward in an extending direction of the arm part, and
a single-action lock mechanism provided at the holder and fixing the handle grip to the holder,
the single-action lock mechanism including
a lock pin having a distal end penetrating a through hole provided at the holder and engaged with at least one engagement hole provided at the arm part,
a spring biasing the lock pin toward the arm part,
a housing fixed to the holder and accommodating the lock pin and the spring, and
a knob disposed outside the housing and connected to the lock pin.

The configuration according to such an aspect enables the passenger grip of the utility vehicle to be mounted and dismounted easily.

DETAILED DESCRIPTION

According to an aspect of the present invention, a utility vehicle includes a passenger grip for a crew seated on a passenger seat, the passenger grip including a handle grip having an arm part extending from a dashboard toward the passenger seat, and a grip part provided at the arm part and gripped by the crew seated on the passenger seat, a holder outserted to the arm part of the handle grip and holding the arm part movably forward and backward in an extending direction of the arm part, and a single-action lock mechanism provided at the holder and fixing the handle grip to the holder, the single-action lock mechanism including a lock pin having a distal end penetrating a through hole provided at the holder and engaged with at least one engagement hole provided at the arm part, a spring biasing the lock pin toward the arm part, a housing fixed to the holder and accommodating the lock pin and the spring, and a knob disposed outside the housing and connected to the lock pin.

For example, the holder is disposed in a space behind the dashboard, the arm part of the handle grip extends from the space behind the dashboard toward a cabin space through an arm through hole provided at the dashboard, and the knob of the single-action lock mechanism is positioned in a glove box provided at the dashboard.

For example, the arm through hole is provided above the glove box, and the knob of the lock mechanism is positioned adjacent to a ceiling surface of an interior space of the glove box.

For example, the dashboard is provided with a hood positioned above the arm through hole and covering the arm through hole.

For example, the at least one engagement hole at the arm part of the handle grip includes a plurality of engagement holes aligned in the extending direction of the arm part.

For example, the holder is detachably attached to a frame of the utility vehicle extending in the space behind the dashboard.

An embodiment will now be described in more detail with reference to FIGS. 1 to 10. FIGS. 1 to 10 depict a utility vehicle according to an embodiment.

Unnecessarily detailed description may not be made where appropriate. For example, an already well known matter may not be described in detail or substantially identical configurations may not be descried repeatedly. It is to prevent the following description from becoming unnecessarily long as well as to allow those skilled in the art to easily understand the description.

The inventors provide the accompanying drawings and the following description in order to allow those skilled in the art to fully understand the present disclosure, without any intention to limit a subject matter recited in the patent claims.

Directions "front", "rear", "left", and "right" mentioned in the present application are viewed from a driver boarding and driving the utility vehicle.

Figure 1:
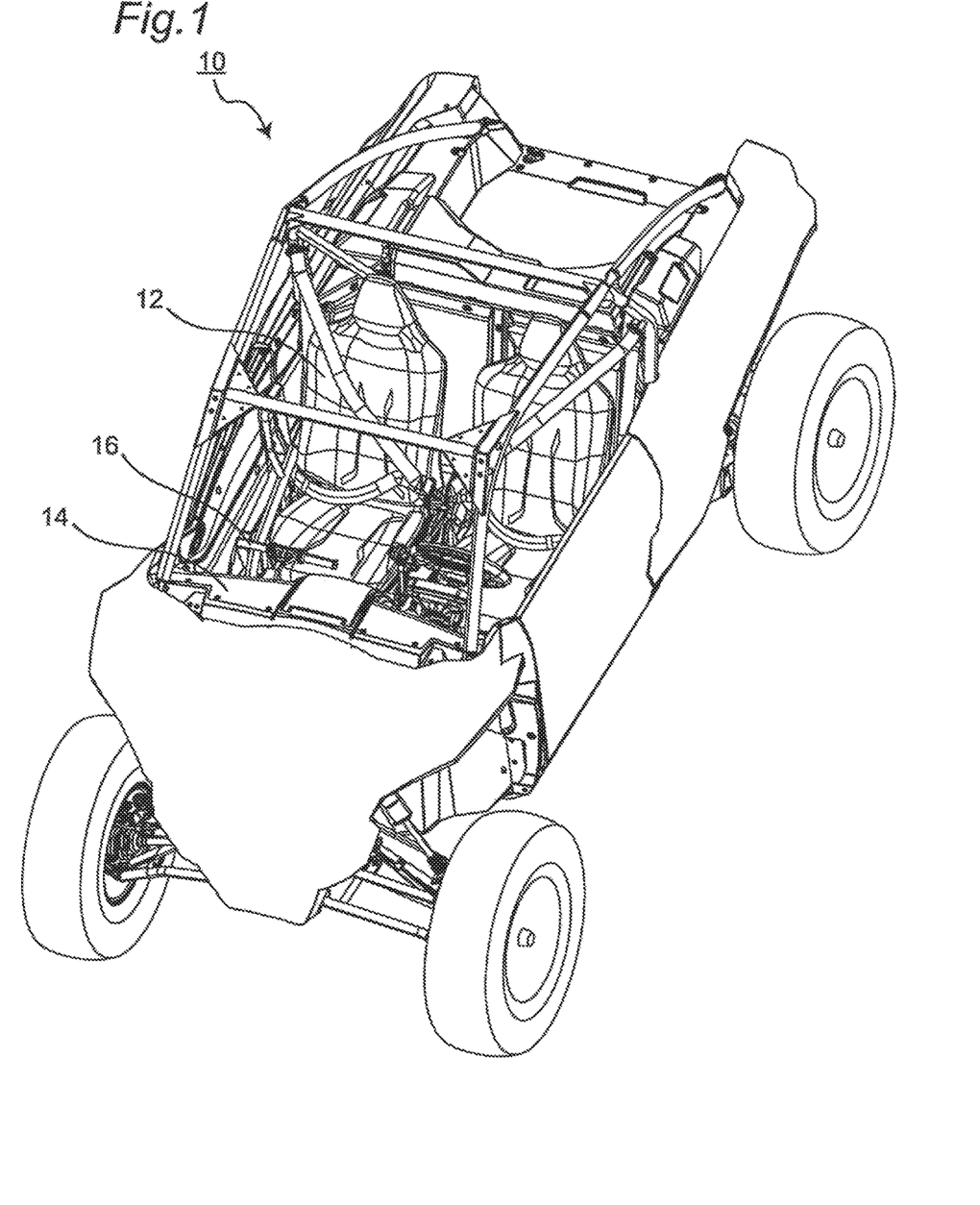
FIG. 1 is a perspective view of a utility vehicle according to an aspect of the present invention.

As depicted in FIG. 1, a utility vehicle 10 according to the embodiment includes a passenger grip 16 provided at a dashboard 14 ahead of a passenger seat 12 and gripped by a crew seated on the passenger seat 12.

Figure 2:
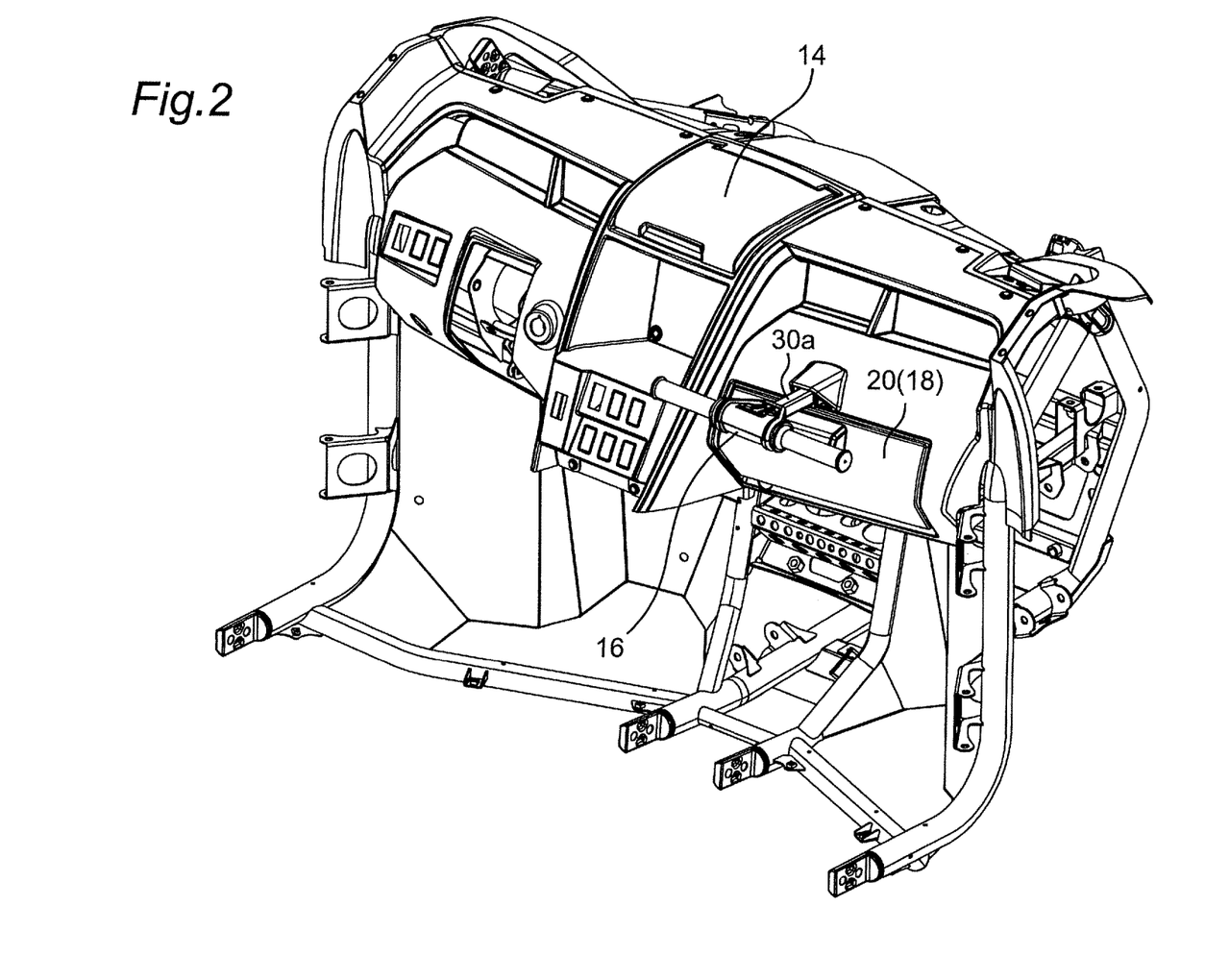
FIG. 2 is a perspective view of a dashboard of the utility vehicle.

As depicted in FIGS. 1 and 2, the passenger grip 16 projects from the dashboard 14 toward the passenger seat 12. In the embodiment, the passenger grip 16 is provided above a glove box 18 (above a box cover 20 thereof) of the dashboard 14.

Figure 3:
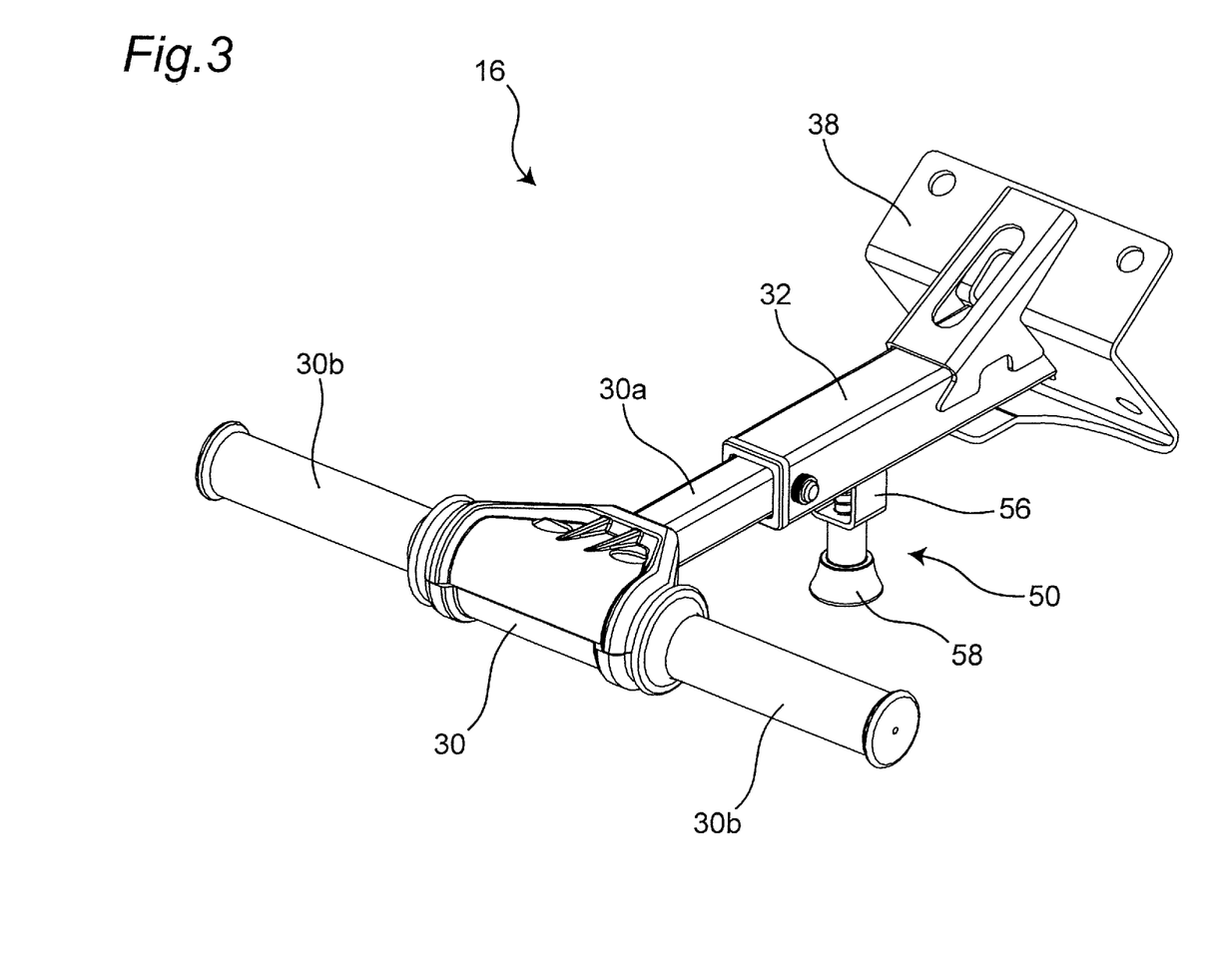
FIG. 3 is a perspective view of a passenger grip.
Figure 4:
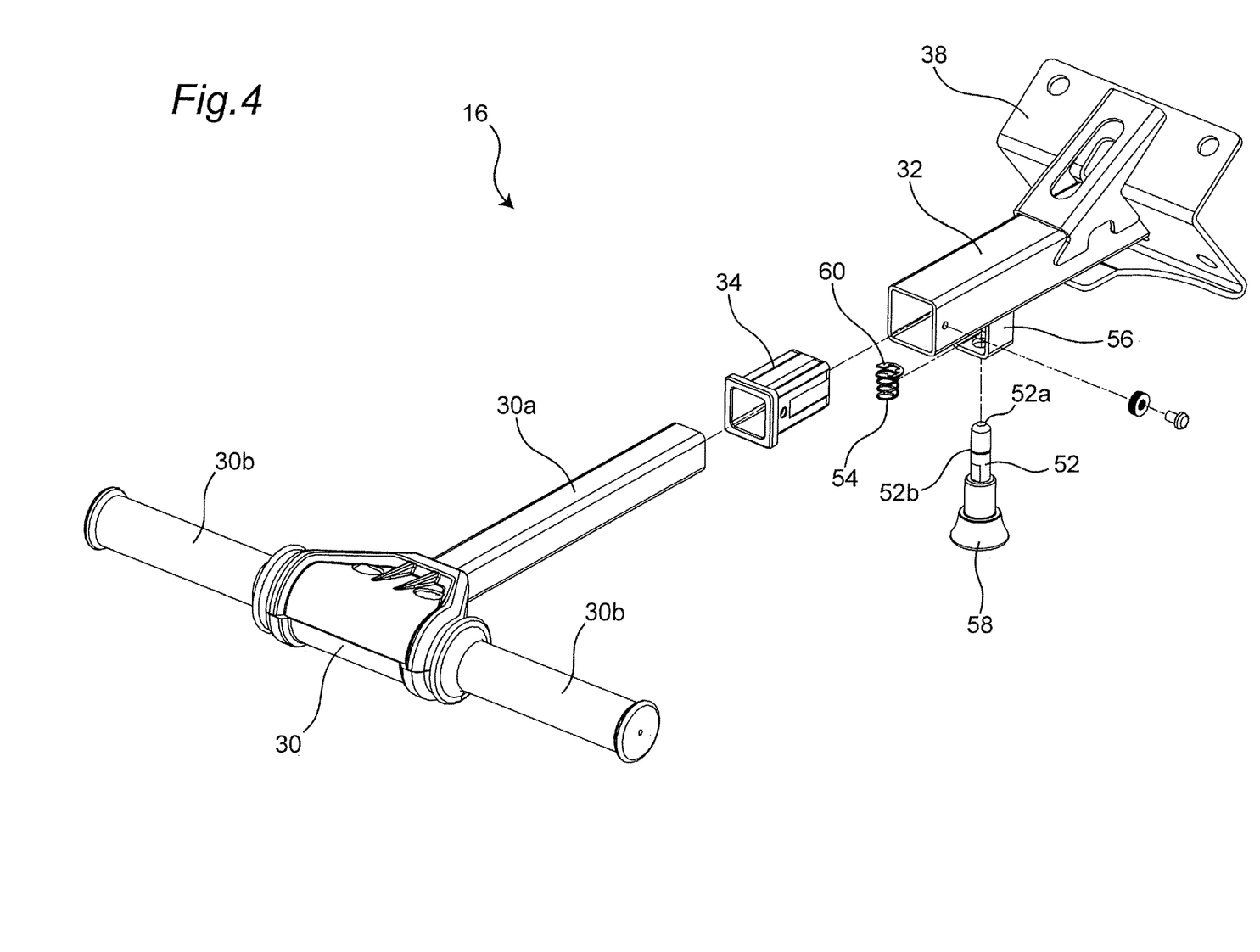
FIG. 4 is an exploded view of the passenger grip.
Figure 5:
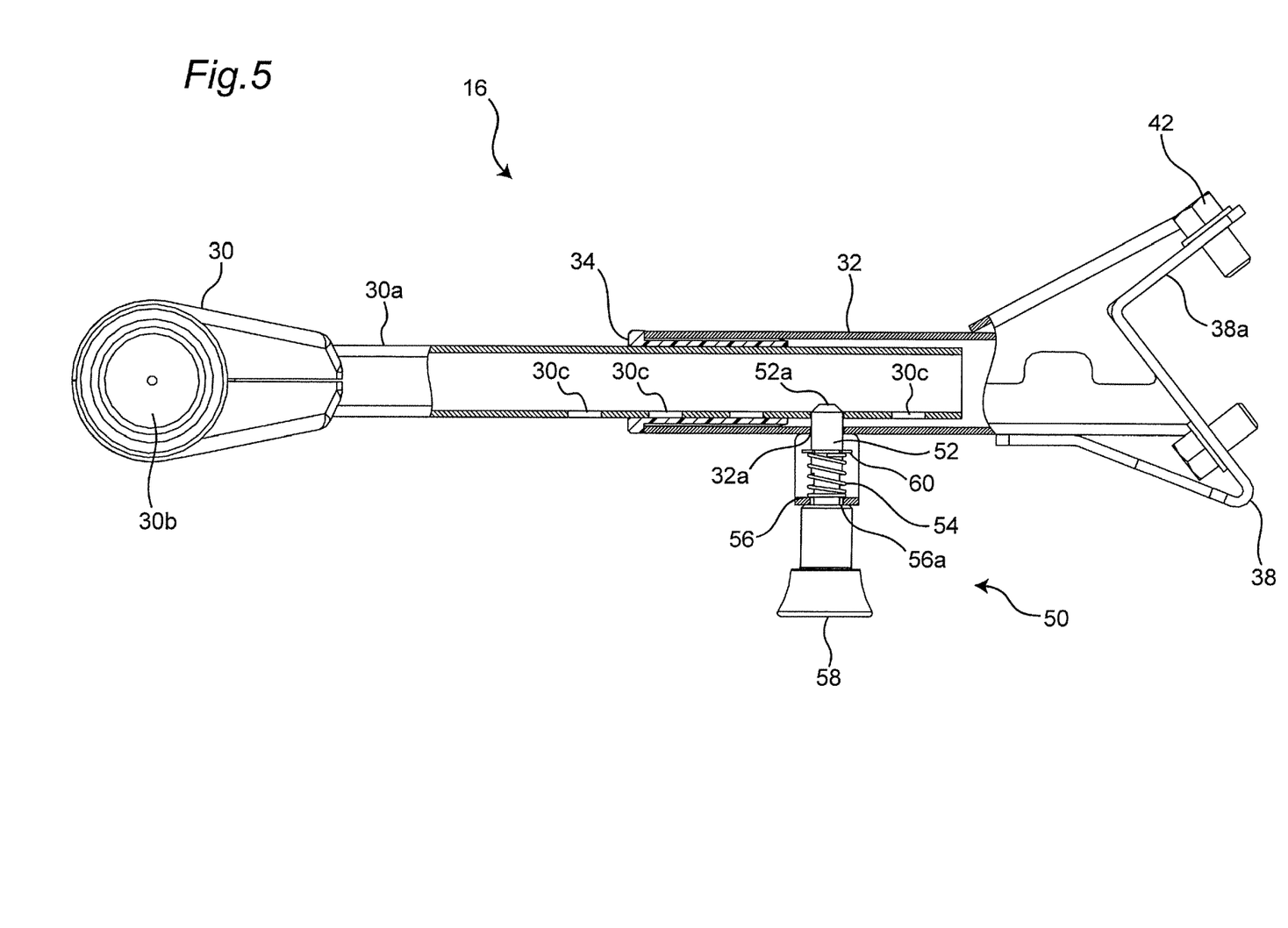
FIG. 5 is a partial sectional view of the passenger grip.

FIG. 3 is a perspective view of the passenger grip, FIG. 4 is an exploded view of the passenger grip, and FIG. 5 is a partial sectional view of the passenger grip.

As depicted in FIGS. 3 and 4, the passenger grip 16 includes a handle grip 30 gripped by the crew member seated on the passenger seat 12, and a holder 32 detachably holding the handle grip 30.

In the embodiment, the handle grip 30 has a "T" shape. The handle grip 30 includes an arm part 30a extending from the dashboard 14 toward the passenger seat 12 as depicted in FIG. 2, and a grip part 30b extending in the vehicle width direction of the utility vehicle 10 from a distal end of the arm part 30a as depicted in FIG. 3 and gripped by the crew member seated on the passenger seat 12.

In the embodiment, the arm part 30a of the handle grip 30 according to the present embodiment is configured by a hollow metallic pipe member having a quadrilateral cross section. The grip part 30b is made of a rubber material, a resin material, or the like, and is detachably attached to the handle grip 30. That is, the grip part 30b is replaceable.

The holder 32 of the passenger grip 16 can be outserted to the arm part 30a of the handle grip 30, and is a tubular metallic pipe member having a quadrilateral cross section, in the embodiment. The holder 32 holds the arm part 30a movably forward and backward in an extending direction of the arm part 30a of the handle grip 30. The holder 32 can alternatively have a shape different from the tubular shape as long as the holder 32 can be outserted to the arm part 30a of the handle grip 30. In the embodiment, the holder 32 is provided with a bush member 34. The arm part 30a of the handle grip 30 is inserted to the bush member 34, so that the handle grip 30 becomes movable forward and backward smoothly with respect to the holder 32.

Figure 6:
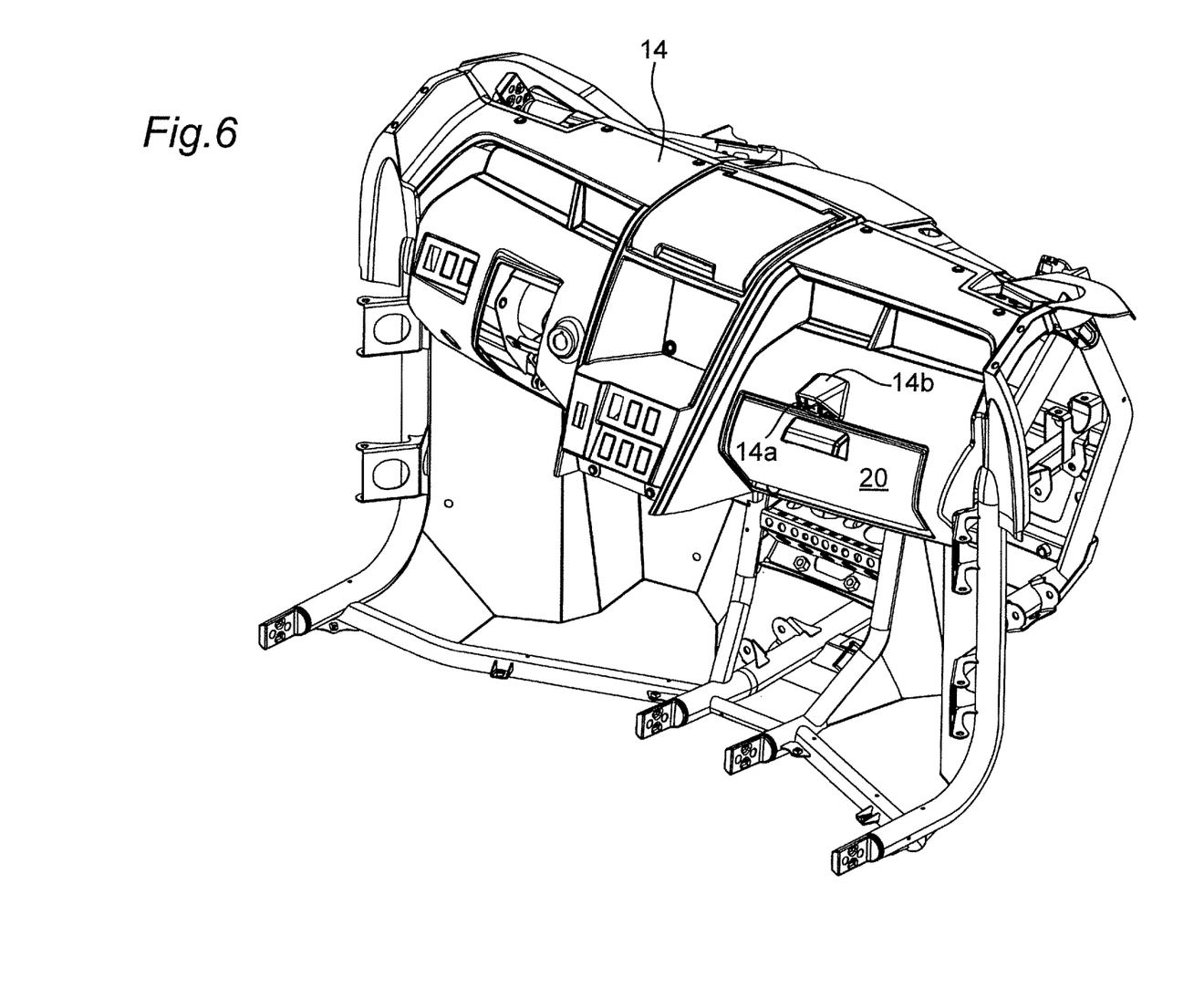
FIG. 6 is a perspective view of the dashboard with the passenger grip being removed.
Figure 7:
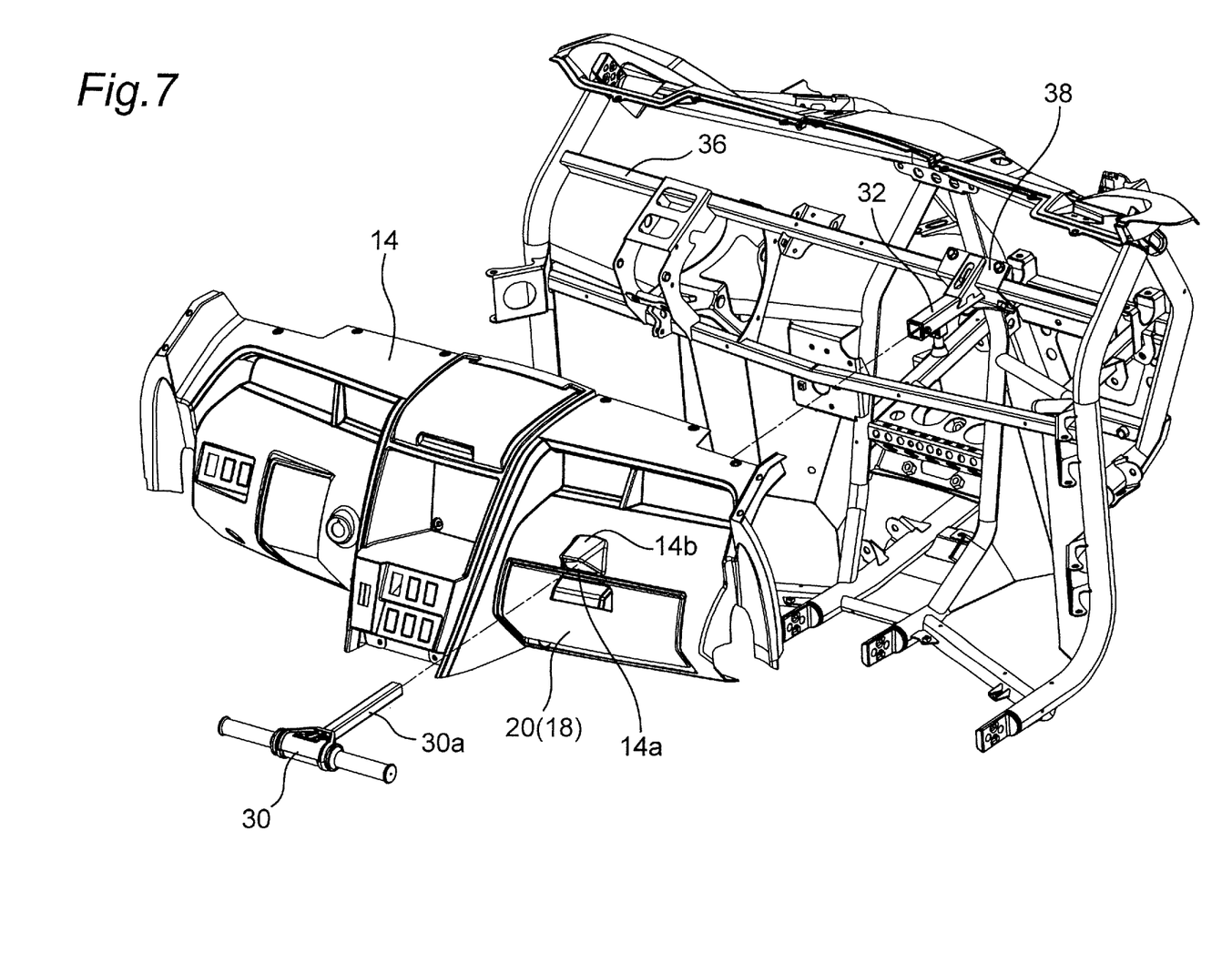
FIG. 7 is a perspective view depicting mounting the passenger grip to a frame.

FIG. 6 depicts the dashboard from which the handle grip is removed. FIG. 7 depicts a state where the dashboard is detached.

Figure 8:
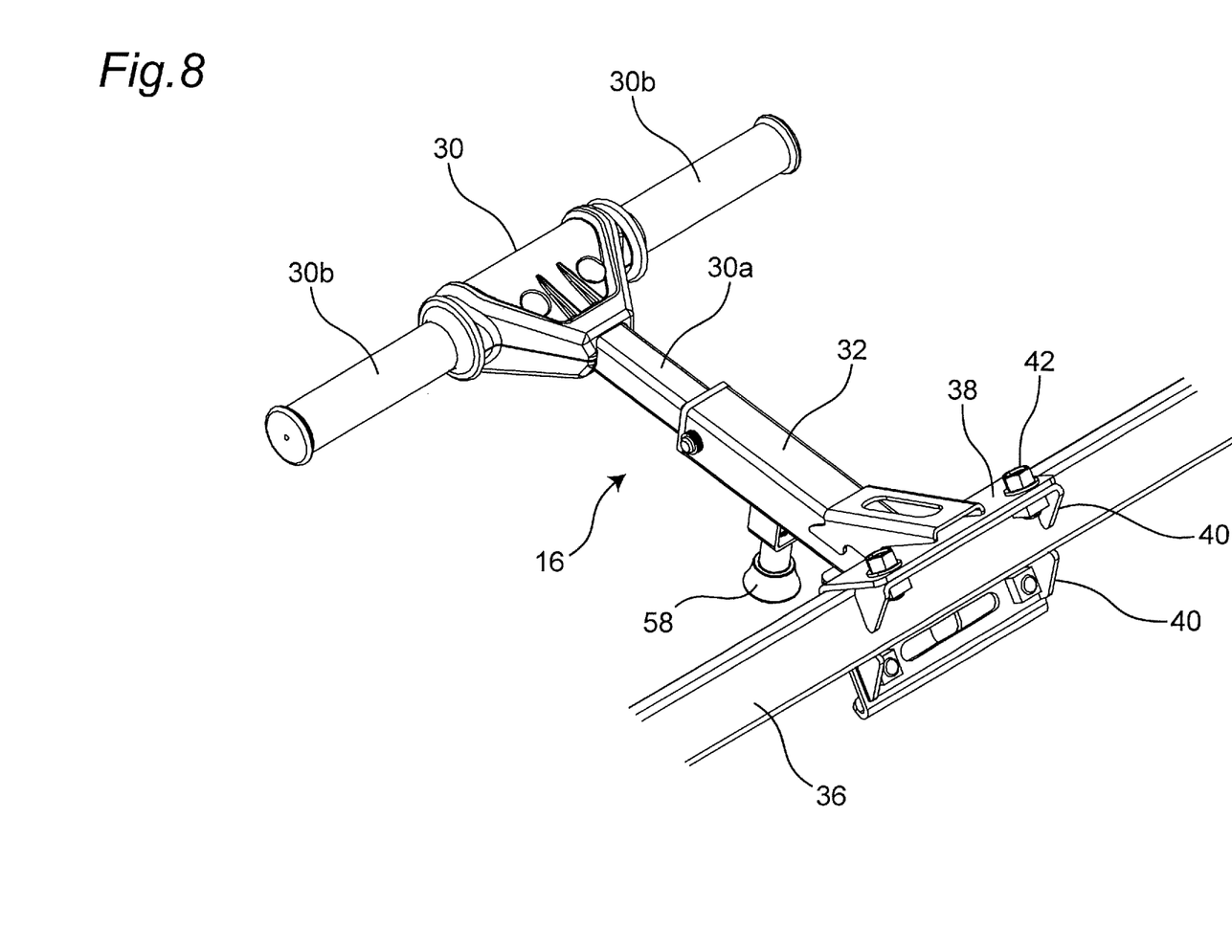
FIG. 8 is a perspective view of the passenger grip mounted to the frame.

As depicted in FIGS. 6 and 7, in the embodiment, the holder 32 of the passenger grip 16 is disposed in a space behind the dashboard 14. The holder 32 disposed in the space behind the dashboard 14 is attached to a frame (beam) 36 extending in the vehicle width direction of the utility vehicle 10. In the embodiment, the holder 32 is detachably attached to the beam 36 to allow the passenger grip 16 to be replaceable. Specifically, as depicted in FIG. 3, in the embodiment, the holder 32 is provided with an L-shaped bracket 38 having an engagement surface 38a detachably engaged with the beam 36 having a rectangular cross section. As depicted in FIG. 8, a hook plate 40 is fixed to the bracket 38 by means of a bolt 42, so that the bracket 38 and the hook plate 40 grip the beam 36. The holder 32 may be attached to the utility vehicle 10 at a position other than the beam 36. Furthermore, the holder 32 may be attached to the beam 36 in a manner other than the above.

The handle grip 30 is held by the holder 32 disposed in the space behind the dashboard 14, as depicted in FIG. 7, the dashboard 14 is provided with an arm through hole 14a. In the embodiment, the arm through hole 14a is provided above the glove box 18 (the box cover 20 thereof). The arm part 30a of the handle grip 30 penetrating the arm through hole 14a is held by the holder 32, and extends from the space behind the dashboard 14 toward a cabin space (the passenger seat 12). As depicted in FIG. 6, the arm through hole 14a is provided thereon with a hood 14b covering the arm through hole 14a to prevent the arm through hole 14a from standing out after the handle grip 30 is removed.

As depicted in FIGS. 3 to 5, the holder 32 is provided with a single-action lock mechanism 50 configured to fix the handle grip 30 to the holder 32.

As depicted in FIGS. 4 and 5, the single-action lock mechanism 50 includes a lock pin 52, a spring 54 biasing the lock pin 52, a housing 56 provided at the holder 32, and a knob 58 connected to the lock pin 52.

As depicted in FIG. 5, the arm part 30a of the handle grip 30 has a plurality of engagement holes 30c aligned in the extending direction of the arm part 30a. The holder 32 holding the arm part 30a has a through hole 32a. The handle grip 30 is fixed to the holder 32 by inserting a distal end 52a of the lock pin 52 through the through hole 32a of the holder 32 and engaging the distal end 52a with one of the engagement holes 30c of the arm part 30a. When the distal end 52a of the lock pin 52 is engaged with a different one of the engagement holes 30c, the arm part 30a of the handle grip 30 has a portion projecting from the holder 32 and having a different length. That is, the projecting portion of the arm part 30a of the handle grip 30 can be adjusted in length by changing the engagement hole 30c engaged with the distal end 52a of the lock pin 52.

In order to keep engagement between the engagement hole 30c of the handle grip 30 and the distal end 52a of the lock pin 52, in other words, in order to fix the handle grip 30 to the holder 32, the spring 54 biases the lock pin 52 toward the arm part 30a of the handle grip 30. In the embodiment, the lock pin 52 is disposed inside the spring 54. The lock pin 52 is thus provided with a snap ring 60 receiving a first end of the spring 54 (as depicted in FIG. 4, there is provided a groove 52b engaged with the snap ring 60).

The lock pin 52 and the spring 54 (as well as the snap ring 60) are accommodated in the housing 56 provided at the holder 32. The lock pin 52 is accommodated in the housing 56 movably forward and backward with respect to the engagement hole 30c of the arm part 30a of the handle grip 30. The spring 54 has a second end received by the housing 56, and can thus bias the lock pin 52 (the snap ring 60) toward the engagement hole 30c.

The lock pin 52 has another end (opposite to the distal end 52a) connected to the knob 58 disposed outside the housing 56. When the crew member moves the lock pin 52 backward by the knob 58 against the biasing force of the spring 54, the distal end 52a of the lock pin 52 is disengaged from the engagement hole 30c of the handle grip 30. The handle grip 30 thus becomes movable forward or backward with respect to the holder 32, or can be detached from the holder 32. When the crew member releases the knob 58, the lock pin 52 is moved forward by the biasing force of the spring 54, and the distal end 52a engages with the engagement hole 30c of the handle grip 30.

The single-action lock mechanism 50 thus configured allows the crew member to cancel fixation between the holder 32 and the handle grip 30 with a single hand. The crew member can thus operate the knob 58 alone with a first hand to cancel fixation between the holder 32 and the handle grip 30, and simultaneously move the handle grip 30 forward or backward with respect to the holder 32 or detach the handle grip 30 from the holder 32 with a second hand. That is, the passenger grip 16 is mounted and dismounted easily.

As depicted in FIG. 5, the lock pin 52 penetrates a through hole 56a of the housing 56 and the snap ring 60 is attached to the penetrated portion so as not to fall off the housing 56. This prevents losing the lock pin 52.

Figure 9:
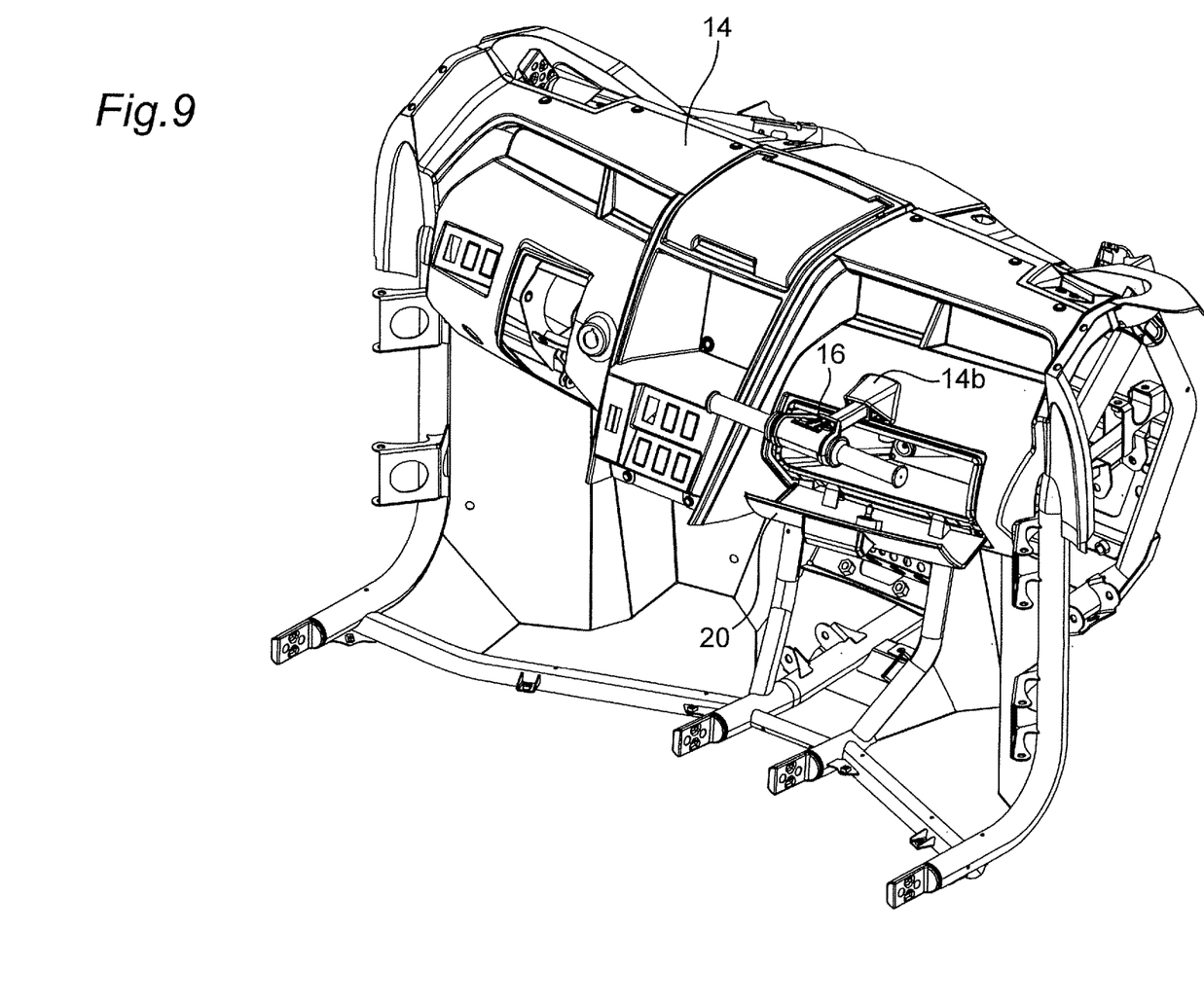
FIG. 9 is a perspective view of an opened glove box.
Figure 10:
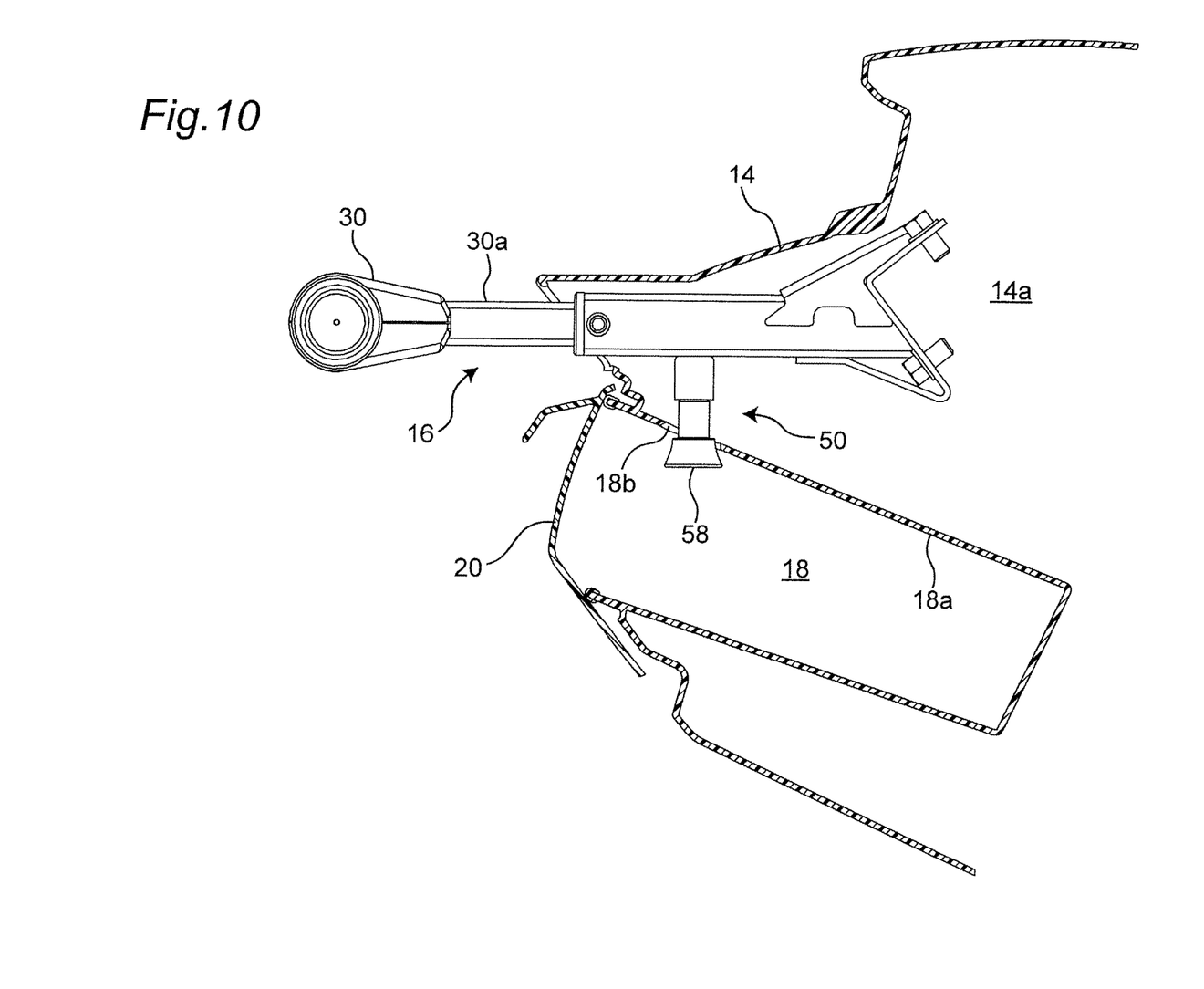
FIG. 10 is a sectional view of the glove box.

As depicted in FIGS. 9 and 10, in the embodiment, the single-action lock mechanism 50 is mostly positioned in the space behind the dashboard 14, whereas the knob 58 is positioned in the glove box 18. The crew member thus needs to open the box cover 20 of the glove box 18 as depicted in FIG. 9 to access the knob 58. The knob 58 is disposed in the glove box 18 to prevent unintended disengagement of the handle grip 30 from the holder 32. In a case where the knob 58 is disposed outside the glove box 18, the crew may involuntarily touch the knob 58 to cause unintended disengagement of the handle grip 30 from the holder 32.

The knob 58 of the single-action lock mechanism 50 is preferably positioned adjacent to a ceiling surface 18a of an interior space of the glove box 18. The knob 58 thus disposed is unlikely to disturb entrance of goods into the glove box 18.

The embodiment described above exemplifies the technique of the present invention. The accompanying drawings and the detailed description are provided for the exemplification. Those constituent elements depicted in the accompanying drawings and disclosed in the detailed description will include constituent elements essential for achievement of the object as well as constituent elements not essential for achievement of the object but for exemplification of the technique. Accordingly, those inessential constituent elements should not be regarded as being essential simply because the inessential constituent elements are depicted in the accompanying drawings or are disclosed in the detailed description.

The above embodiment is provided for exemplification of the technique according to the present invention, and will thus accept modification, replacement, addition, removal, and the like in various manners within the scope of the patent claims or an equivalent scope.

The invention claimed is:

1. A utility vehicle comprising:
a passenger grip for a crew member seated on a passenger seat, the passenger grip including:
 a handle grip having an arm part extending from a dashboard toward the passenger seat, and a grip part provided at the arm part and to be gripped by the crew member seated on the passenger seat,
 a holder outserted to the arm part of the handle grip and holding the arm part movably forward and backward in an extending direction of the arm part, and
 a single-action lock mechanism provided at the holder and fixing the handle grip to the holder, the single-action lock mechanism including:
  a lock pin having a distal end penetrating a through hole provided at the holder and engaged with at least one engagement hole provided at the arm part,
  a spring biasing the lock pin toward the arm part,
  a housing fixed to the holder and accommodating the lock pin and the spring, and
  a knob disposed outside the housing and connected to the lock pin,
 wherein the holder is disposed in a space behind the dashboard, the arm part of the handle grip extending from the space behind the dashboard toward a cabin space through an arm through hole provided at the dashboard, and
 wherein the knob of the single-action lock mechanism is positioned in a glove box provided at the dashboard.

2. The utility vehicle according to claim 1, wherein the arm through hole is positioned above the glove box, and
the knob of the lock mechanism is positioned adjacent to a ceiling surface of an interior space of the glove box.

3. The utility vehicle according to claim 1, wherein the dashboard has a hood positioned above the arm through hole and covering the arm through hole.

4. The utility vehicle according to claim 1, wherein the at least one engagement hole at the arm part of the handle grip comprises a plurality of engagement holes aligned in the extending direction of the arm part.

5. The utility vehicle according to claim 1, wherein the holder is detachably attached to a frame of the utility vehicle extending in the space behind the dashboard.

* * * * *